United States Patent
Hedman et al.

(10) Patent No.: US 10,369,981 B2
(45) Date of Patent: Aug. 6, 2019

(54) METHOD FOR SELECTING A GEAR

(71) Applicant: VOLVO TRUCK CORPORATION, Göteborg (SE)

(72) Inventors: Anders Hedman, Marstrand (SE); Lars-Erik Theodorsson, Partille (SE)

(73) Assignee: Volvo Truck Corporation, Göteborg (SE)

( * ) Notice: Subject to any disclaimer, the term of this patent is extended or adjusted under 35 U.S.C. 154(b) by 712 days.

(21) Appl. No.: 14/894,544

(22) PCT Filed: Jun. 12, 2013

(86) PCT No.: PCT/EP2013/001715
§ 371 (c)(1),
(2) Date: Nov. 30, 2015

(87) PCT Pub. No.: WO2014/198281
PCT Pub. Date: Dec. 18, 2014

(65) Prior Publication Data
US 2016/0121872 A1    May 5, 2016

(51) Int. Cl.
*B60W 30/186* (2012.01)
*B60W 10/02* (2006.01)
(Continued)

(52) U.S. Cl.
CPC .......... *B60W 10/02* (2013.01); *B60W 10/113* (2013.01); *B60W 30/186* (2013.01); *B60W 30/18027* (2013.01); *F16D 48/062* (2013.01); *F16H 61/0213* (2013.01); *F16H 61/688* (2013.01); *B60W 2510/0241* (2013.01);
(Continued)

(58) Field of Classification Search
CPC .............. B60W 10/02; B60W 10/113; B60W 30/18027; B60W 30/186; B60W 2510/0241; B60W 2710/021; F16H 61/688; F16D 48/062; F16D 2500/5023; F16D 2500/50296
See application file for complete search history.

(56) References Cited

U.S. PATENT DOCUMENTS

2007/0051196 A1* 3/2007 Baldwin .............. B60W 10/113
                                                            74/335
2011/0218719 A1* 9/2011 Kirchner ............... B60W 10/02
                                                            701/53
(Continued)

FOREIGN PATENT DOCUMENTS

| EP | 1013966 A1 | 6/2000 |
| JP | 2006132562 A | 5/2006 |
| WO | 2004096597 A1 | 11/2004 |

OTHER PUBLICATIONS

International Search Report (dated Feb. 27, 2014) for corresponding International App. PCT/EP2013/001715.
(Continued)

*Primary Examiner* — Huan Le
(74) *Attorney, Agent, or Firm* — WRB-IP LLP

(57) ABSTRACT

A method is provided for balancing clutch wear in a dual clutch transmission. The method involves performing the steps of determining which clutch unit of first and second clutch units is subjected to the most accumulated wear and selecting a gear actuated by the other clutch unit during launch of the vehicle.

14 Claims, 3 Drawing Sheets

(51) Int. Cl.
*F16H 61/02* (2006.01)
*F16H 61/688* (2006.01)
*F16D 48/06* (2006.01)
*B60W 30/18* (2012.01)
*B60W 10/113* (2012.01)

(52) U.S. Cl.
CPC ............... *B60W 2710/021* (2013.01); *B60W 2710/1005* (2013.01); *B60Y 2300/186* (2013.01); *B60Y 2300/428* (2013.01); *B60Y 2400/428* (2013.01); *F16D 2500/30406* (2013.01); *F16D 2500/5023* (2013.01); *F16D 2500/50296* (2013.01); *F16D 2500/70488* (2013.01); *F16H 2061/023* (2013.01)

(56) References Cited

U.S. PATENT DOCUMENTS

| | | |
|---|---|---|
| 2011/0238276 A1 | 9/2011 | Tsujimura et al. |
| 2014/0150583 A1* | 6/2014 | Terashima ............ F16H 61/688 74/330 |

OTHER PUBLICATIONS

International Preliminary Report on Patentability (dated May 15, 2015) for corresponding International App. PCT/EP2013/001715.

* cited by examiner

METHOD FOR SELECTING A GEAR

BACKGROUND AND SUMMARY

The invention relates to a method for balancing clutch wear in a dual clutch transmission, wherein clutch wear can be balanced by determining which clutch is most frequently used for transferring power and selecting a gear actuated by the other clutch during launch of the vehicle.

In recent years the use of dual clutch transmissions (DCT) has increased in vehicles, also for commercial vehicles. A typical dual clutch transmission configuration includes a pair of mutually exclusively operating input clutches which selectively drive a pair of input shafts.

The input shafts may be disposed on opposite sides of an output shaft or may be disposed concentrically between spaced-apart output shafts. One of each of a plurality of pairs of constantly meshing gears which provide the various forward and reverse gear ratios is freely rotatably disposed on one of the shafts and the other of each pair of gears is coupled to one of the other shafts. A plurality of tooth clutches can selectively connect the freely rotatable gears to the associated shaft.

Dual clutch transmissions provide operating characteristics which can combine those of both conventional automatic planetary transmissions and manual transmissions. An advantageous characteristic is the power-shift function, which allows gear shifts with uninterrupted torque transfer to suitable ground engaging members, such as driving wheels or tracks. Dual clutch transmissions also exhibit good fuel economy due to their good gear mesh efficiency, ratio selection flexibility and reduced clutch wear.

A problem with dual clutch transmissions is that one of the clutches may be subjected to more wear than the other clutch. For instance, during long distance driving, power shifting between the top gears can cause increased wear for the clutch used for shifting into the top gear. Uneven wear of the clutches will eventually lead to repair or replacement of the worn clutch, before the other clutch is sufficiently worn to warrant repair. Disassembly of the transmission to service the clutches is time consuming and expensive, which can lead to unnecessary replacement of the less worn clutch merely to avoid an additional servicing at a later date when the latter clutch is worn out.

This problem occurs in all such dual clutch transmissions, dry and wet, but is particularly noticeable for dry clinches.

It is desirable to provide an improved method tier controlling the wear of a dual clutch transmission that solves or minimises the above problems.

In the subsequent text, the term "launch" is intended to describe a situation where a vehicle is being started from standstill. The launch ends when the transmission is changed into a subsequent gear higher than the gear used during launch. A gear change can involve selecting the next gear in a sequence of gears (1st gear to 2nd gear, etc.) or by skipping one or more gears in the sequence (1st gear to 3rd gear, etc.). The gear selection can, for instance, depend on vehicle weight and whether the vehicle is launched uphill or downhill.

According to a preferred embodiment, an aspect of the invention relates to a method for balancing clutch wear in a dual clutch transmission. The transmission comprises a first transmission mechanism arranged to transmit mechanical driving force from an output shaft of a prime mover, such as an internal combustion engine, to a first input shaft and to put any one of a first set of gears in an engaged state to connect the first input shaft to ground engaging members, such as driving wheels or tracks. In the subsequent text, the invention will be described for use with ground engaging members in the form of driving wheels. The transmission further comprises a second transmission mechanism arranged to transmit mechanical driving three from the output shaft of the prime mover to a second input shaft and to put any one of a second set of gears in an engaged state to connect the second input shaft to the driving wheels. A controllable first clutch unit is arranged to bring the output shaft of the prime mover and the first input shaft into engagement with each other. Similarly, a controllable second clutch unit is arranged to bring the output shaft of the prime mover and the second input shaft into engagement with each other. An electronic control unit is arranged to control gear selection and clutch unit actuation.

The method is carried out by performing the steps of
determining which of the first and second clutch unit is subjected to the most accumulated wear; and
selecting a gear for launch actuated by the other clutch unit than the above determined clutch unit during launch of the vehicle.

According, to the invention, the method involves selecting a gear higher than the lowest gear during launch of the vehicle, if possible. Under circumstances where this selection is not possible for reasons of drivability, the electronic control unit is arranged to override this gear selection and allow selection of a gear required for launch of the vehicle. This situation can occur when, for instance, the vehicle is launched uphill and cannot be started in a gear higher than the lowest gear. Another example is when the vehicle is to be driven at very low speed, e.g., at low-speed maneuvers for docking a trailer.

The invention is preferably, but not necessarily, related to a method for balancing clutch wear in a dual clutch transmission (DCT). Clutch wear mainly occurs during launch from standstill and during long distance driving, when shifting between the top gears. In particular, power shifting between the top (highest and second highest) gears can cause increased wear for the clutch used for shifting into the top gear. Power shifting allows gear shifts with uninterrupted torque transfer to the driving wheels. In this case clutch wear can be balanced by using the clutch not transferring power in the top gear for launching the vehicle to a greater extent. Preferably, the clutch not transferring power in the top gear is selected for launching, the vehicle during 50-100% of the launches. For example, in a 12-speed DCT gearbox where a first clutch controls odd gears (gears 1, 3, 5, etc.) and a second clutch controls even gears (gears 2, 4, 6, etc.), power shifting at cruising speeds will cause more wear on the second clutch, In order to balance clutch wear, at least half and preferably all launches are performed using an uneven gear controlled by the first clutch. The method is used when starting the vehicle in a gear higher than the lowest (1st) gear. When it is desired to launch the vehicle in a gear higher than the lowest gear. gear. the vehicle will be launched in one of the gears 3, 5, etc. By avoiding gears 2, 4, etc. it is possible to balance clutch wear.

Clutch wear can also occur in gears other than the top gear. Examples of such cases are vehicles frequently operated in cities, on construction sites, on minor roads, etc. where the cruising speed is rarely reached and the vehicle is predominantly used in intermediate gears between the top gear and gears used for launch. In order to determine which clutch is subjected to the most accumulated wear, further method steps are carried out involving:

detecting at least one wear related transmission parameter indicative of clutch wear during operation of the vehicle;

determining which of the first and second clutch unit is subjected to the most wear using the detected parameter; and selecting a gear actuated by the other clutch unit than the above determined clutch unit during launch of the vehicle.

Examples of wear related transmission parameters are the number of gear shifts performed by each clutch, or the amount of accumulated slip energy transferred by each clutch. Depending on factors such as local road conditions, speed restrictions, the driving style of the driver and the typical use of the vehicle, one of the clutches will experience more wear. As opposed to the first case described above, the clutch subjected to most wear need not be the one used for the top gear. In fact, the clutch in question can be either of the first and second clutches, and the clutch subjected to the most wear can vary over time, for instance if the vehicle is being used for different purposes.

Once it has been determined which clutch is subjected to the most wear, a gear actuate by the other clutch is selected during at least 50% of all launches of the vehicle. As an alternative, the other clutch is used for at least 50% of the accumulated clutch slip energy dissipated at launches. As a further alternative, the other clutch is used for at least 50% of the accumulated clutch slip energy dissipated during gear changes.

The method according to the invention as indicated above is preferably applicable on vehicle transmissions having eight or more gears. The method is preferably, but not necessarily, applicable on dual clutch transmissions comprising dry clutches. The invention is primarily intended for commercial vehicles, such as trucks, buses and work vehicles. In such vehicles, it is common practice to launch not exclusively in the lowest gear under certain conditions, such as unladen vehicle and/or downhill road inclination. By doing so, the acceleration of the vehicle is improved, less fuel is consumed and the wear on shift control elements is reduced. This is especially the case if there are a large number of gears in the transmission, e.g., eight gears or more.

The present invention also relates to a computer program, computer program product and a storage medium for a computer all to be used with a computer for executing the method as described in any one of the above examples The computer program comprises program code means for performing all the steps of the above method when said program is run on a computer. The computer program product comprises program code means stored on a computer readable medium for performing all steps of anyone of the above method when said program product is run on a computer. The storage medium, such as a computer memory or a non-volatile data storage medium, is intended for use in a computing environment, the memory comprising a computer readable program code to perform the method.

BRIEF DESCRIPTION OF THE DRAWINGS

In the following text, the invention will be described in detail with reference to the attached drawings. These schematic drawings are used for illustration only and do not in any way limit the scope of the invention. In the drawings.

DETAILED DESCRIPTION

Figure 1:
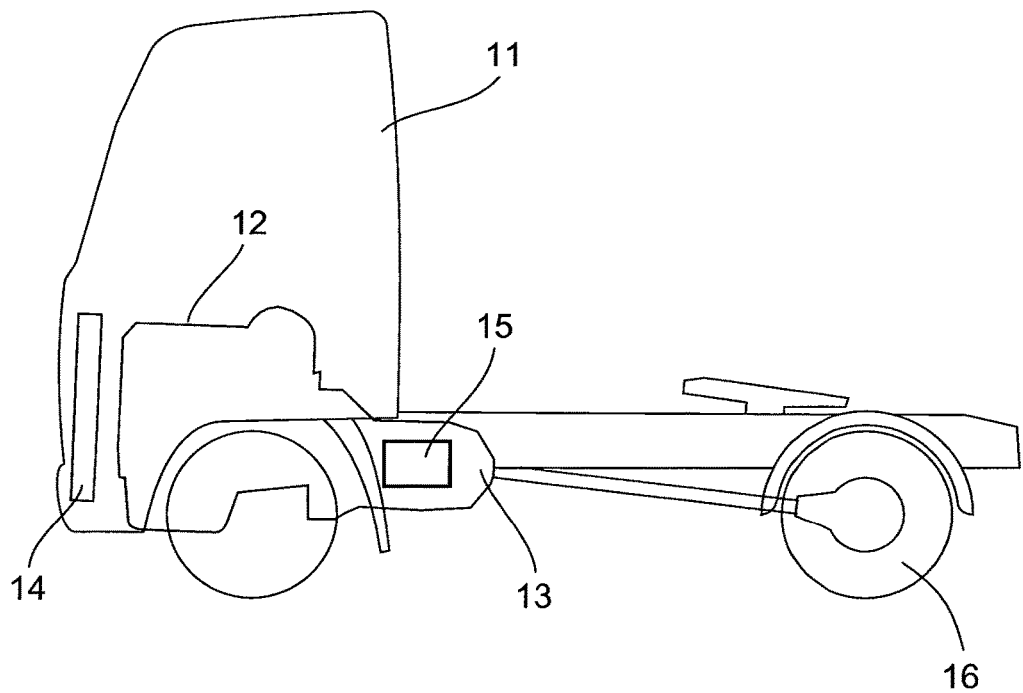
FIG. 1 shows a schematically indicated vehicle for use with the method according to the invention.

FIG. 1 shows a schematically indicated vehicle 11 with a transmission arrangement for use with a method according to the invention. The vehicle 11 is provided with an internal combustion engine (ICE) 12 connected to a transmission 13, such as an automated manual transmission (AMT) for transmitting torque to a vehicle drive axle (not shown). The ICE 12 is connected to a radiator arrangement 14 for cooling engine coolant and oil from the ICE 12. The transmission 13 is controlled by the driver or automatically via an electronic control unit (ECU) 15. The ECU 15 is provided with control algorithms for controlling the transmission independently during, for instance, an engine start requested by the driver. The transmission is controlled to select a gear ratio between the engine 12 and a pair of driven wheels 16.

Figure 2:
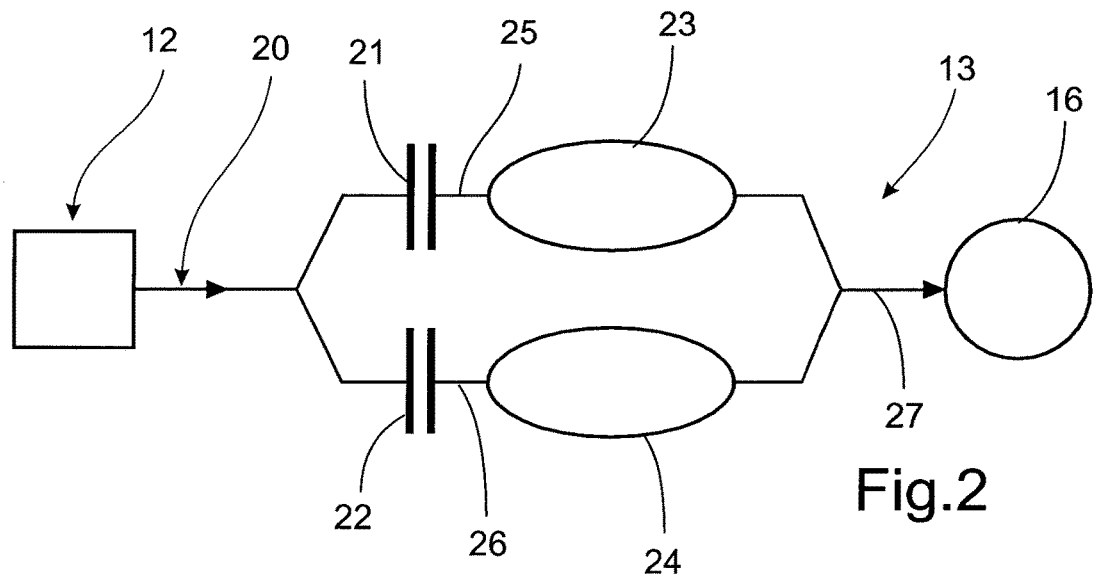
FIG. 2 shows a schematically indicated transmission for use with the method according to the invention.

FIG. 2 shows a schematic diagram of a transmission arrangement suitable for use in a vehicle as indicated in FIG. 1. The engine 12 has an output shaft 20 that is connected to the transmission 13. The transmission 13 comprises a dual clutch arrangement having a first and a second clutch 21, 22, respectively. The first clutch 21 is controlled by the electronic control unit 15 (FIG. 1) to connect the crankshaft 20 to a first gearbox unit 23, comprising a first input shaft 25, an output shaft and a number of gears (not shown) that can be actuated for controlling the gear ratio between the engine 12 and the driven wheels 16. Similarly, the second clutch 22 can be controlled to connect the crankshaft 20 to a second gearbox unit 24, comprising a second input shaft 26, an output shaft and a number of gears (not shown) that can be actuated for controlling said gear ratio. The mechanical design of the first and second gearbox units 23, 24 is not part of the invention per se and will not be described in further detail. Using the first and a second clutches 21, 22 in turn, the gears of the first and second gearbox units 23, 24 can be used for driving the wheels 16 via a drive shaft 27. There may be parts, e.g., gearwheels, which are used in both the first and second gearbox units 23. 24.

Alternatively, a range gear (not shown) can be connected to the output shafts of the respective first and second gearbox units 23, 24. In this example, the range gear can be a planetary gear, having a sun wheel driven by the respective transmission output shaft The range gear is connected to a drive shaft for driving the wheels 6.

The electronic control unit 15 is connected to a number of existing sensors (not shown) for detecting and monitoring the number of actuations performed by each clutch and into which gear. The degree and duration of actuation of each clutch is detected to allow calculation of clutch slip energy applied to each clutch. Actual clutch wear can also be detected and monitored by the electronic control unit 15. Data collected by the electronic control unit 15 is used as a basis for calculating and/or estimating the degree of wear for each clutch, in order to determine which clutch is most frequently used.

Figure 3:
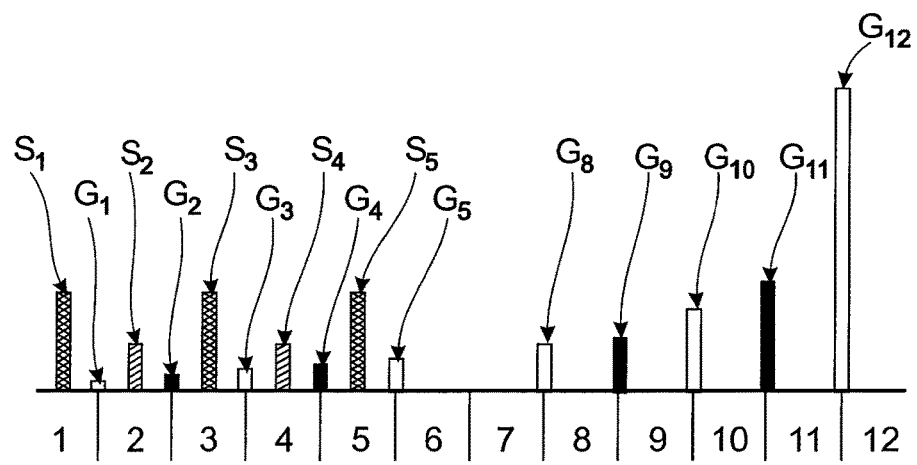
FIG. 3 shows a schematic diagram indicating clutch slip energy for each clutch in a transmission as indicated in FIGS. 2.

FIG. 3 shows a schematic diagram indicating clutch slip energy for each clutch in a state of the art dual clutch transmission having 12 gears. In FIG. 3, the solid stacks indicated Ox represent clutch slip energy transferred during a gear change between adjacent gears. Hatched stacks indicated Sx represent clutch slip energy transferred during a start, or launch, from standstill. The clutch slip energy transferred by a clutch is an indication of the degree of wear caused during actuation of the clutch.

If applied to the transmission shown in FIG. 2, the first clutch 21 would control the gears of the first gearbox unit 23 containing the odd gears 1, 3, 5, 7, 9, 11. In FIG. 3, the accumulated clutch slip energy G1, G3, G5 . . . G9, G11 associated with each gear and transferred by the first clutch 21 when performing a gear change or down) into the respective odd gears (1), 3, 5 . . . 9, 11 is represented by solid black stacks. Similarly, the second clutch 22 would control the gears of the second gearbox unit 24 containing the even gears. The accumulated clutch slip energy G2, G4, G6, G8, G10, G12 associated with each gear and transferred by the second clutch 22 when performing a gear change (up or down) into the respective even gears 2, 4, 6, 8, 10, 12 is represented by solid white stacks. From FIG. 3 it can be seen that gear changes performed in higher gears 8-12 generally cause higher levels of transferred accumulated clutch slip energy G8-G12. than gear changes in lower gears G1-G6. In particular, power shifting between the 11 and 12 m gears at cruising speed causes the greatest transfer of accumulated clutch slip energy G12, with an associated increase in clutch wear to the second clutch 22.

FIG. 3 further indicates the accumulated clutch slip energy S1, S3, S5 transferred by the first clutch 21 during launch using the odd gears 1 3, 5, where the accumulated clutch slip energy S1, S3, S5 associated with each gear is represented by cross-hatched stacks. Similarly, the accumulated clutch slip energy S2, S4, S0 associated with each gear and transferred by the second clutch 22 during launch using the even gears 2, 4, 6 is represented by hatched stacks.

According to the invention it should first be determined which clutch is subjected to the most accumulated wear To determine which clutch is subjected to the most wear, the values for accumulated clutch slip energy for gear shift Ox and launch Sx for the respective gears associated with each clutch are added together to give a total accumulated clutch slip energy GTA for the respective clutch, wherein GTA1=(G1+G3+G5+ . . . +G11)+(S1+S3+S5) for the first clutch 21, and GTA2=(G2+G4+G6+ . . . +G12)+(S2+S4+S6) for the second clutch 22.

In the example shown in FIG. 3, which is representative of a vehicle used for long distance hauling, the clutch subjected to the most accumulated wear is the second clutch 22. This is caused mainly by power-shifting from gears eleven into gear twelve, which results in the very high accumulated wear value G12 for gear twelve. In response to this, the electronic control unit would select a gear actuated by the first clutch 21 during launch of the vehicle, Preferably, a gear actuated by the first clutch is selected during at least 50% of all launches of the vehicle. In this case the selected gear should be an odd gear not including the first gear, that is, one of gears 3, 5, etc. This is the reason for the values S3 and S5 being larger than S2 and S4.

According to an alternative example it should first be determined which clutch is subjected to the most accumulated wear during launch. To determine which clutch is subjected to the most wear, the values for accumulated clutch slip energy for launch Sx for the respective gears associated with each clutch are added together to give an accumulated clutch slip energy during launch SA for the respective clutch, wherein:

SA1=(S1+S3+S5) for the first clutch 21, and

SA2=(S2+S4+S6) for the second clutch 22.

In the example shown in FIG. 3, the clutch subjected to the most accumulated wear during launch is the first clutch 21. Preferably, a gear actuated by the second clutch 22 is selected during at least 50% of all launches of the vehicle. In this case the selected gear should be an even gear not including the first gear, that is, one of gears 2, 4, etc. This example can be applicable for a vehicle used for urban haulage, where the main source of wear is frequent launches. For this type of vehicle the accumulated clutch slip energy G12 for the 12th gear would be considerably less, as most of the wear would occur during launch.

According to a further alternative example it is possible to determine which clutch is subjected to the most accumulated wear during gear shifts only. In the example shown in FIG. 3, the accumulated clutch slip energy during gear shift GA would correspond to the sum of the Gx values for each clutch, that is GA1=(G1+G3+G5+ . . . G11) for the first clutch 21, and GA2=(G2+G4+ . . . G12) for the second clutch 22.

In order to balance clutch wear, at least half and preferably all launches are performed using a gear controlled by the clutch subjected to the least accumulated wear, that is, the lowest value for total accumulated clutch slip energy GA. The method is used when starting the vehicle in a gear higher than the lowest (1st) gear. This gear selection is used whenever possible, provided that the selection is allowed by the current conditions. For instance, if the vehicle is to be manoeuvred at low speed, is carrying a heavy load and/or is launched uphill, the selection may be overridden for drivability reasons.

The present invention also relates to a computer program, computer program product and a storage medium for a computer all to be used with a computer for executing the method as described in any one of the above, examples.

Figure 4:
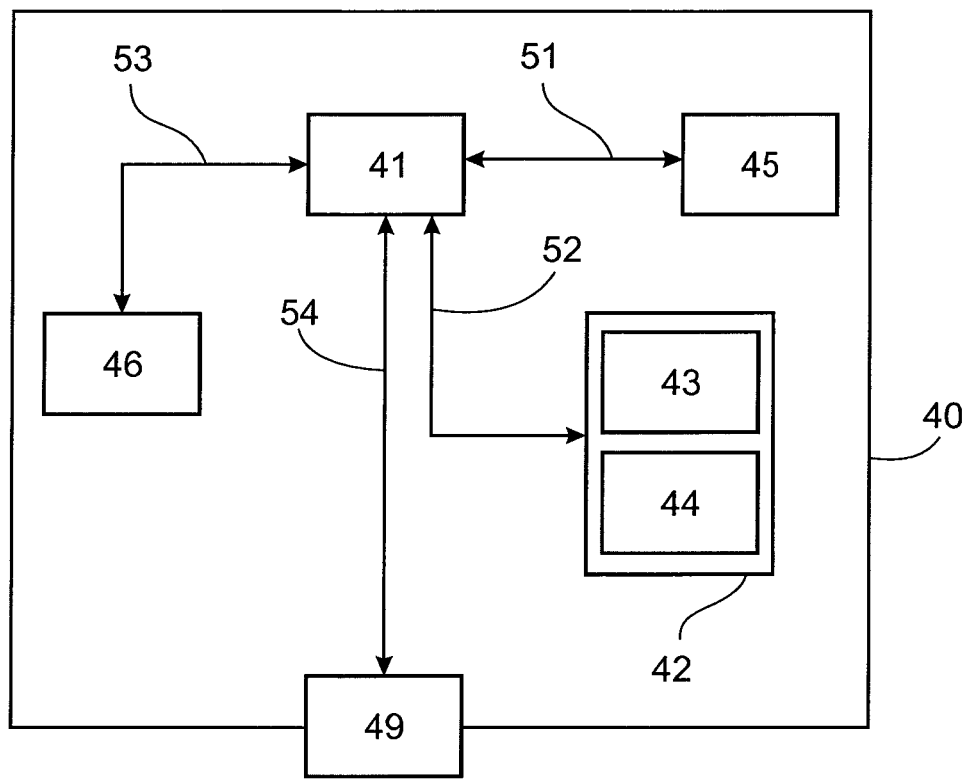
FIG. 4 shows the invention applied on a computer arrangement.

FIG. 4 shows an apparatus 40 according to one embodiment of the invention, comprising a non-volatile memory 42, a processor 41 and a read and write memory 46. The memory 42 has a first memory part 43, in which a computer program for controlling the apparatus 40 is stored. The computer program in the memory pan 43 for controlling the apparatus 40 can be an operating system.

The apparatus 40 can be enclosed in, for example, a control unit, such as the control unit 15 in FIG. 1. The data-processing unit 41 can comprise, for example, a microcomputer.

The memory 42 also has a second memory part 44, in which a program for controlling the target gear selection function according to the invention is stored. In an alternative embodiment, the program for controlling the transmission is stored in a separate non-volatile storage medium 45 for data, such as, a CD or an exchangeable semiconductor memory. The program can be stored in an executable form or in a compressed state.

When it is stated below that the data-processing unit 41 runs a specific function, it should be clear that the data-processing unit 41 is running a specific part of the program stored in the memory 44 or a specific part of the program stored in the non-volatile storage medium 42.

The data-processing unit 41 is tailored, for communication with the storage memory 45 through a first data bus 51. The data-processing unit 41 is also tailored for communication with the memory 42 through a second data bus 52. In addition, the data-processing unit 41 is tailored for communication with the memory 46 through a third data bus 53. The data-processing unit 41 is also tailored for communication with a data port 49 by the use of a fourth data bus 54.

The method according, to the present invention can be executed by the data-processing unit 41, by the data-processing unit 41 running the program stored in the memory 44 or the program stored in the non-volatile storage medium 45.

The invention should not be deemed to be limited to the embodiments described above, but rather a number of further variants and modifications are conceivable within the scope of the following patent claims. For instance, the examples according to FIGS. 1 and 2 are directed to a commercial vehicle of the tractor-trailer type. However, the invention as outlined in the remaining figures can also be applied to trucks without trailers as well as articulated trucks, buses and work vehicles.

The invention claimed is:

1. A method for balancing clutch wear in a dual clutch transmission, the transmission comprising a first transmission mechanism arranged to transmit mechanical driving force from an output shaft of a prime mover and a first input shaft and by putting any one gear of a first set of gears of the first transmission mechanism in an engaged state to connect the first input shaft to ground engaging members; a second transmission mechanism arranged to transmit mechanical driving force from the output shaft of the prime mover and a second input shaft and by putting any one gear of a second set of gears of the second transmission mechanism in an engaged state to connect the second input shaft to the ground engaging members; a controllable first clutch unit arranged to bring the output shaft of the prime mover and the first input shaft into engagement with each other; a controllable second clutch unit arranged to bring the output shaft of the prime mover and the second input shaft into engagement with each other, and an electronic control unit arranged to control gear selection of the first transmission mechanism and the second transmission mechanism and actuation of the first and second clutch unit, and wherein gears in the first set of gears of the first transmission mechanism and in the second set of gears of the second transmission mechanism range from a lowest gear to a highest gear, the method comprising the control unit performing the steps of:

determining which of the first and second clutch unit is subjected to a greater amount of accumulated wear based on which one of the first and second clutch units is being used for a highest gear; and selecting a gear for launch actuated by a clutch unit of the first and second clutch unit that is subjected to a lesser amount of accumulated wear than the clutch unit that is determined to be subjected to the greater amount of accumulated wear, which gear is a higher gear than a lowest gear in the dual clutch transmission.

2. The method according to claim 1, further comprising the steps of:

detecting at least one wear related transmission parameter indicative of clutch wear during operation of the vehicle;

determining which of the first and second clutch unit is subjected to the most wear using the detected parameter; and selecting a gear for launch actuated by the other clutch unit than the above determined clutch unit during launch of the vehicle.

3. The method according to claim 2, wherein the wear related transmission parameter is a number of gear shifts performed by each clutch unit.

4. The method according to claim 2, wherein the wear related transmission parameter is a total accumulated amount of slip energy transferred by each clutch unit.

5. The method according to claim 2, wherein the wear related transmission parameter is an accumulated amount of slip energy transferred by each clutch unit during gear shifts.

6. The method according to claim 2, wherein the wear related transmission parameter is an accumulated amount of slip energy transferred by each clutch unit during launches.

7. The method according to claim 1, comprising selecting the gear for launch actuated by the clutch unit of the first and second clutch unit that is subjected to the lesser amount of accumulated wear than the clutch unit that is determined to be subjected to the greater amount of accumulated wear during at least 50% of all launches of the vehicle.

8. The method according to claim 1, wherein the first clutch unit controls odd gears and the second clutch unit controls even gears.

9. The method according to claim 1, wherein the method is applicable on vehicle transmissions having eight or more gears.

10. The method according to claim 1, wherein the method is applicable on dual clutch transmissions comprising dry clutches.

11. The method according to claim 1, wherein the method is applicable on a commercial vehicle.

12. A computer comprising a program for performing all the steps of claim 1 when the program is run on the computer.

13. A computer program product comprising a computer program stored on a non-transitory computer readable medium for performing all steps of claim 1 when the program product is run on a computer.

14. A non-transitory storage medium for use in a computing environment, the storage medium comprising a computer program to perform the method of claim 1.

\* \* \* \* \*